United States Patent [19]

Izumi et al.

[11] 4,056,592
[45] Nov. 1, 1977

[54] PROCESS FOR PREPARATION OF THERMOSETTING RESIN POWDER PAINTS

[75] Inventors: Ryoji Izumi, Neyagawa; Shoji Kobayashi, Akashi; Toshiharu Ono, Suita; Toru Shirato, Hiroshima; Akiyoshi Fujii, Hiroshima; Tadashi Okihara, Hiroshima, all of Japan

[73] Assignees: Dai Nippon Toryo Co., Ltd.; The Japan Steel Works Ltd., both of Japan

[21] Appl. No.: 593,875

[22] Filed: July 7, 1975

[30] Foreign Application Priority Data

July 11, 1974 Japan ............................ 49-79548

[51] Int. Cl.² .......................................... B29B 1/02
[52] U.S. Cl. .................................... 264/141; 264/144; 264/175; 264/210 R; 264/216; 425/325; 425/394
[58] Field of Search .............. 264/141, 140, 144, 28, 264/237, 348, 216, 210 R, 175

[56] References Cited

U.S. PATENT DOCUMENTS

| | | | |
|---|---|---|---|
| 2,534,291 | 12/1950 | Moss | 264/237 |
| 2,582,294 | 1/1952 | Stober | 264/141 |
| 3,004,296 | 10/1961 | Snedeker | 264/237 |
| 3,090,076 | 5/1963 | Corbett | 264/237 |
| 3,382,295 | 5/1968 | Taylor, Jr. et al. | 260/860 |
| 3,725,340 | 4/1973 | Erdmenger et al. | 264/176 R |
| 3,732,349 | 5/1973 | Chen et al. | 264/237 |

FOREIGN PATENT DOCUMENTS

1,079,262  8/1967  United Kingdom.

Primary Examiner—James B. Lowe
Attorney, Agent, or Firm—Bucknam and Archer

[57] ABSTRACT

A process for the preparation of thermosetting resin powder paints comprising the steps of extruding a melt of a resinous composition for a thermosetting powder paint, continuously cooling the composition and forming it into a sheet, and pulverizing the formed sheet. Air blasting nozzles are directed at the sheet while it is on the cooling rolls. The adherence between the sheet and the rolls is improved, and the air blasting nozzles provide an auxiliary means for cooling the sheet.

4 Claims, 5 Drawing Figures

PROCESS FOR PREPARATION OF THERMOSETTING RESIN POWDER PAINTS

BACKGROUND OF THE INVENTION

1. Field of the Invention

This invention relates to a process for the preparation of thermosetting resin powder paints. More particularly, the invention relates to a process for the preparation of thermosetting resin powder paints comprising the steps of extruding a melt of a resinous composition, cooling the composition and forming it into a sheet, and pulverizing the formed sheet.

2. Description of the Prior Art

Since powder paints include no solvent, they permit to prevent pollution or contamination not only in the paint-preparation process but also at the coating step. Accordingly, demand for powder paints has recently increased and the production of powder paints is now on the increase. Methods presently practiced industrially for the production of thermosetting resin powder paints comprise, in general, incorporating pigments, curing agents and additives into resins, blending them homogeneously by means of a premixer such as ribbon blender, dispersing the pigments and curing agents into molten resins by means of a melt-extruding machine such as an extruder, a kneader, a Banbury mixer and a heating roll, pulverizing and kneading the pigment particles by a mechanical force, withdrawing the product and cooling it, roughly grinding it, finely pulverizing the roughly ground product to obtain a particle size distribution suitable for painting, and sieving the resulting particles to obtain a powder paint product having a desired particle size distribution (see, for example, U.S. Pat. No. 3,382,295, and British Pat. Specification No. 1,043,998 U.S. Pat. No. 3,725,340 describes the preparation of cross-linkable lacquer resins by continuously reacting melts of lacquers resins containing hydroxyl groups with alkoxymethyl isocyanates in screw extruders. The liquid alkoxymethyl isocyanate is added to the melt of the resin containing hydroxyl groups and the reaction is completed in a few minutes).

As another special method for the preparation of powder paints, there can be mentioned a method for preparing powder resins which comprises expanding a resin to form a foamed structure and subjecting the foamed structure to comminution to produce particles (see British patent Specification No. 1,079,262), and a method for preparing powder paints which comprises concentrating a solution of a resin under reduced pressure by means of a self-cleaning screw evaporator, rapidly cooling the resulting viscous melt by cold air or in water or other liquid, and pulverizing the resulting solid to produce a powdery composition (see British patent Specification No. 1,353,351).

In general, methods for the production of powder paints presently worked commercially comprise steps of material compounding, pre-mixing, melt kneading and dispersion, rough grinding, comminution, (sieving) and product recovery. These steps will now be described in detail.

A pre-mixture of a pigment, a resinous component and additives is continuously kneaded by a melt-kneading machine (extruder) and extruded from a rod die of the extruder, and the extrudate is elongated into a sheet having a thickness of about 2 mm by means of a pair of rolls. Then, the sheet is cooled by cold air while it is being transported on a conveyor roll, or it is naturally cooled while it is being moved on a cooling roll. Then, the cooled sheet is roughly ground into ships having a size of 10 mm × 30 mm and the ships are comminuted. With increase of the extrusion rate (Kg/hour) in the extruder, the equipment for the step of cooling the extrudate and forming it into a sheet must inevitably be made larger to cope with the increased extrusion rate and depending on the temperature of the extrudate and properties of the resin, and operations for this step become complicated and troublesome.

Extrusion rates of extruders presently used for the production of powder paints are 80 to 150 Kg/hour at the most, and temperatures of molten extruded resins are about 100° to about 130° C. The steps of cooling such extrudates and forming them into sheets are generally performed by expanding a molten resin extrudate by using a pair of rolls having a diameter of about 200 mm and a length of about 600 mm which are rotated at a rate of 7 to 10 rpm, to thereby form the extrudate into a sheet having a thickness of about 2 mm and a width of about 200 mm, and naturally cooling the sheet while transporting it on a conveyor (having a length of about 5 to about 10 mm) moved at a speed of 6 to 12 m per minute or feeding cold air into the sheet by a fan or cooler to effect forced cooling according to need.

FIG. 1 shows diagrammatically in section an example of an apparatus for practising the above conventional method, in which reference numerals 6, 7, 8, 9 and 10 denote a material inlet, an extruder, a pair of cooling rolls, a conveyer and a granulator, respectively.

As another conventional method, there can be mentioned a method comprising sprinkling cold water at the outlet of expanding rolls to promote cooling of a sheet of a molten expanded resin, a method comprising cutting the as-extruded resin in water or cold air by the strand process and a method comprising cutting the extruded sheet after water cooling.

However, if the extrusion rate and the manufacturing rate are to be increased so as to satisfy the demand for continuous mass-production, and for example, the extrusion rate of the extruder is to be increased to 300 to 500 Kg/hour, then in the foregoing conventional methods a large quantity of cold air must be fed to rapidly and uniformly cool a large quantity of a high-temperature, melt-extruded resin, and the length and width of the cooling conveyor must be made larger. Accordingly, the size of the production plant must also be increased. Therefore, according to the conventional method, it is industrially difficult or impossible to increase the extrusion rate.

The method comprising sprinkling water on melt-extruded resins to cool them is defective in that a part of curing agents and other additives incorporated in thermosetting powder paints are dissolved in the water, the water content of the powder paint is increased, and the quality of the product is degraded drastically.

Further, in the case of powder paints of the low temperature-baking type, since a long time is required for complete cooling according to the above-mentioned cooling method, the curing reaction cannot be avoided during the cooling step.

SUMMARY OF THE INVENTION

This invention relates to a novel process for the preparation of thermosetting resin powder paints in which the above-mentioned defects and disadvantages of the conventional techniques are substantially or totally eliminated.

It is a primary object of this invention to provide a process according to which a thermosetting resin powder paint of high quality can be produced in large quantities and at high manufacturing rates.

Another object of this invention is to provide a process for the preparation of powder paints in which a sheet of an extruded resin is not influenced by water during the cooling step because the sheet is not subjected to sprinkling by or immersion in water.

Still another object of this invention is to provide a process for the production of powder paints in which the extrusion rate can be increased while reducing the space required for production equipment.

In accordance with this invention, there is provided a process for the production of thermosetting resin powder paints which comprises the steps of (1) extruding a thermosetting resinous composition for a powder paint in the molten state from an extruder die, (2) continuously cooling the extruded composition and forming it into a sheet by means of a plurality of rolls including press rolls for rolling the composition into a sheet, cooling feed rolls and withdrawal take-up rolls disposed in this order, and (3) pulverizing the so formed sheet.

DESCRIPTION OF THE PREFERRED EMBODIMENTS

According to the process of this invention, a thermosetting resinous compositions is first melted and kneaded in a heating and melting-kneading machine at a temperature higher than the melting or softening point of the resin but lower than the curing point of the resin.

Then, the composition is extruded in the molten state from the die of an extruder. The temperature of the composition at the time of extrusion is 90° to 140° C, preferably 100° to 120° C. The extrusion rate is 100 to 600 Kg/hour, preferably 300 to 500 Kg/hour.

The extrudate is then passed continuously through sheet-forming press rolls, cooling feed rolls maintained at a cooling temperature of 15° to 30° C, preferably 20° to 25° C, and withdrawal take-up rolls, whereby a continuous sheet having a thickness of 1 to 3 mm and a width of 200 to 400 mm is obtained. At this point, the sheet transportation rate is 5 to 10 m/min or the rotation rate of the rolls is maintained at 1 to 10 rotations per minute. At the terminal portion of the roll assembly, namely just before the granulation step, the sheet is maintained between room temperature (25° C) and 50° C.

Finally, the sheet is pulverized to obtain a powder paint.

An embodiment of the process of this invention will now be illustrated in detail by reference to the accompanying drawings.

Figure 3:
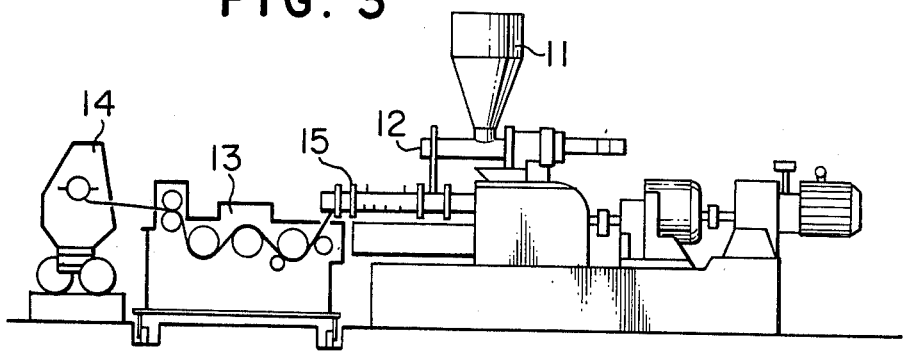
FIG. 3 is a diagram illustrating the apparatus used in the process of this invention.

The outline of an apparatus for use in practising the process of this invention is illustrated in FIG. 3.

Referring to FIG. 3, raw materials, namely a resin, a pigment, a curing agent and other additives, are charged from a raw material inlet 11, and they are kneaded in a heating and melt kneading machine 12 to form a thermosetting resinous composition. The composition is extruded in the molten state from an extruder 15. Then, the extruded composition is formed into a sheet by a continuous sheet-forming and cooling machine 13 comprising a plurality of rolls, and the sheet is pulverized by a granulator 14. Any of the known types of granulators can be used in this invention. If desired, the pulverized product is sieved to obtain a desired particle size distribution. Thus, there is obtained a product or a powder paint.

The continuous sheet-forming and cooling machine used for cooling and sheeting the thermosetting resinous composition extruded in the molten state in the process of this invention comprises sheet-forming press rolls (sheeting rolls), cooling feed rolls (casting rolls), withdrawal take-up rolls (guide rolls), a stand for supporting these rolls and an adjustment mechanism for adjusting the conditions of these rolls.

Figure 1:
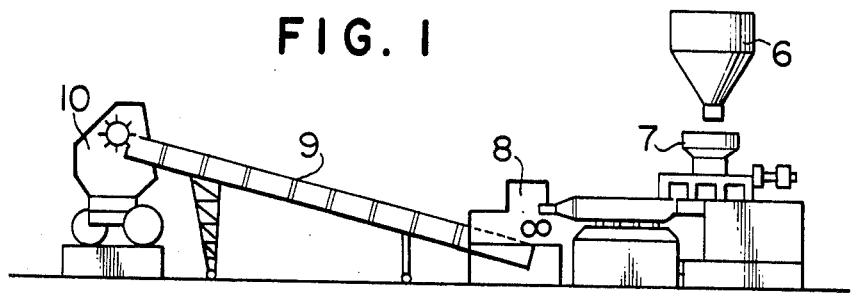
FIG. 1 is a diagram illustrating in section an apparatus used in the conventional method.
Figure 2:
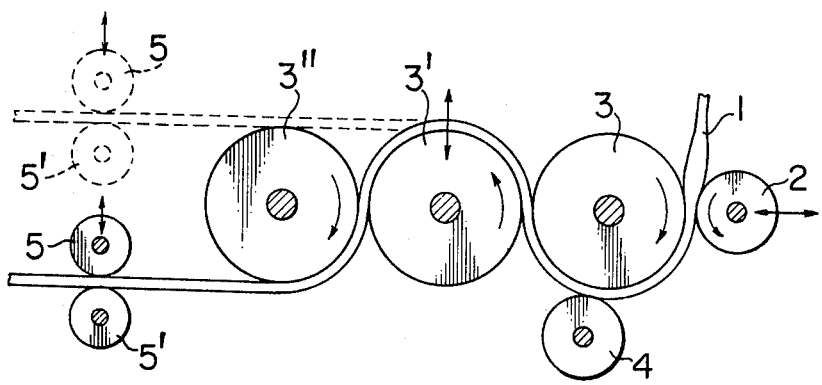
FIG. 2 is a sectional view of an embodiment of the cooling and sheet-forming rolls used in the process of this invention.

An enlarged sectional view of such roll assembly (including 3 cooling rolls) is shown in FIG. 2.

In FIG. 2, reference numeral 1 denotes molten resin, and there are disposed a sheeting roll 2, casting rolls 3, 3' and 3", a back-up roll 4, an upper take-up roll 5 and a lower take-up roll 5'. Rolls 2, 3, 3', 3" and 5 are of the driving type, and their positions can be shifted and adjusted in the directions shown by arrows. In this invention, when the amount of the resinous compositions to be treated is increased, it is possible to increase the number of the casting rolls (3 in FIG. 2) or increase the diameter of these rolls. Of course, such modification is included in the scope of this invention.

As is seen from FIGS. 2 and 3, the raw material is melt-kneaded by a heating and melt-kneading machine such as an extruder and is continuously extruded therefrom to fall between the sheeting roll and the first casting roll. The molten resin is generally molded into a thickness of 1.0 to 3.0 mm in the gap between the sheeting roll and the first casting roll while it is being cooled. Then, the resin is introduced to the second and third casting rolls and further cooled. Finally, the resulting resin sheet is taken up by the take-up rolls and fed to the granulator.

The thickness of the sheet is determined by the gap between the sheeting roll and the first casting roll. The sheeting roll is disposed so that it can be moved horizontally and in parallel to the first casting roll and the gap between the sheeting roll and the first casting roll can be adjusted to a fine degree as desired. The second and subsequent casting rolls are disposed so that they can be moved horizontally or vertically and their angles to the sheet can be changed as desired depending on the amount of the resinous composition to be treated, the cooling conditions and other factors.

The sheeting roll and first to third casting rolls are jacked rolls, and the surface temperatures of these rolls are controlled by adjusting the temperature or amount of interior cooling water (or oil medium, $CHClF_2$, $CCl_2F_2$ and $CCl_2F—CCl_2F$) passing through these rolls. In short, the conditions for cooling the sheet can be selected at will and controlled with ease in this invention. In case the amount of the resinous composition to be treated is greatly reduced, a short pass such as shown by the dotted lines in FIG. 2 may be adopted. Accordingly, the operation conditions can be changed within a broad range in this invention. As regards the peripheral speeds of these rolls, in general, the peripheral speed of the casting rolls is made equal to that of the sheeting roll, but the take-up roll is arranged so that the peripheral speed of the take-up roll can be adjusted minutely independently from other rolls. If desired, it is possible to arrange the second and subsequent casting rolls so that their peripheral speeds can be adjusted minutely independently from the other rolls.

The back-up roll is disposed so as to prevent slackening of the sheet from the first casting roll, but provision of this roll is not indispensible.

Figure 4:
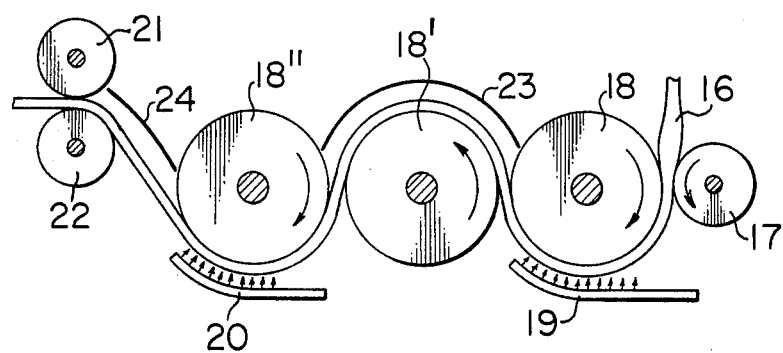
FIG. 4 is a sectional view of another embodiment of the cooling and sheet-forming rolls used in the process of this invention.

In practising the process of this invention, an apparatus as shown in FIG. 4 can also be adopted. This apparatus can be said to be an improvement of the apparatus shown in FIG. 2, and an air blasting device 19, 20 is disposed instead of the back-up roll shown in FIG. 2.

In FIG. 4, reference numeral 16 denotes molten resin, and there are disposed a sheeting roll 17, casting rolls 18, 18' and 18", an upper take-up roll 21, a lower take-up roll 22, guide plates 23 and 24, and air blasting nozzles 19 and 20.

Members other than 19, 20, 23 and 24 have the same functions as described with respect to FIG. 2.

Guide plates 23 and 24 are disposed to guide the sheet smoothly to subsequent rolls while preventing the sheet fed from above or below from flying out upwardly.

Figure 5:
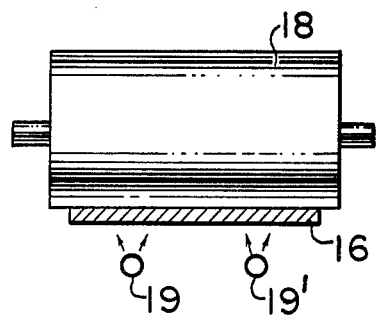
FIG. 5 is a view illustrating a casting roll and air blasting nozzles in FIG. 4.

Air blasting nozzles 19 and 20 are disposed along the peripheral faces of the rolls 18 and 18' apart therefrom by certain distances to extend below the sheet transfer passage toward the advancing direction of the sheet, as shown in FIG. 4. These nozzles are opened to face the entire surfaces of the rolls, and as shown in FIG. 5, one or both of air blasting nozzles 19 and 19' are disposed also in the lateral direction of the roll 18 through the number of the air blasting nozzles is arranged appropriately depending on the size of the sheet 16. In case a plurality of nozzles are disposed, good results are obtained conveniently when there is adopted a mechanism in which the distance between the adjacent nozzles can be adjusted in the lateral direction in accordance with the size of the sheet.

The distance between the blasting nozzle and the cooling roll is changed depending on the dimension of the sheet, but it is generally adjusted between about 20 to about 150 mm. It is preferred that the air blasting rate at the nozzle be at least 30 m/sec and the air pressure be 1.5 to 4 Kg/cm$^2$.

By provision of the above-mentioned air blasting nozzles, the adherence between the sheet and each roll can be improved, and therefore, slackening of the sheet is prevented. Further, they are useful as auxiliary means for cooling the sheet.

The thermosetting resinous composition for a powder paint that is used in the process of this invention comprises a thermosetting resin, a coloring pigment, an extender pigment, a rust-preventive pigment, a dyestuff, a curing agent, a flowability-adjusting agent and other additives.

As the thermosetting resin, there can be employed any of known thermosetting resins for powder paints, for example, thermosetting resins that can be set with the aid of a curing agent and thermosetting resins that have a self-curing property. More specifically, there can be used, for example, epoxy resins, unsaturated polyester resins, acrylic resins, urethane resins formed by blocked isocyanates, and the like.

In this invention, by using a continuous sheeting and cooling machine of the above structure including an assembly of a plurality of rotating rolls for continuous cooling and sheeting, a high quality cooled sheet for granulation can be manufactured at high speeds and in large quantities sufficiently in conformity with an extruder having a high extrusion rate, and this sheet is not influenced by water at all throughout the cooling and sheet-forming step. Accordingly, the mass-production of powder paints can be performed at an elevated rate in the process of this invention. Moreover, the space required for the paint-manufacturing equipments can be reduced to $\frac{1}{3}$ to $\frac{1}{4}$ of the space required in the conventional methods using a cooling conveyor, a fan and the like, and also in this point, the process of this invention is advantageous over the conventional methods.

If this continuous cooling and sheeting machine including a roll assembly is provided with such a mechanical structure as is capable of adjusting the rpm of the roll, the roll position and the cooling degree (the temperature elevation, if required) appropriately depending on the temperature of the resin melt extruded from the extruder and properties (such as specific heat, heat conductivity and hardness) of the resin, conditons for sheet-cooling operation can be changed within a broad range in accordance with required properties of thermosetting powder paints.

In the embodiments shown in FIGS. 2 and 4, a roll assembly for continuously cooling and sheeting molten thermosetting resinous compositions for powder paints comprising a plurality of rotating rolls is disposed so that it can be actuated in the lateral direction, but in this invention, it is also possible to dispose such rolls in the longitudinal direction so that the operation can be facilitated by the weight of the sheet.

As is apparent from the foregoing, the process for cooling and sheeting extruded thermosetting resinous compositions according to this invention can be said to be a superior method capable of sufficiently meeting the requirements of large-quantity, high-speed and high-quality production in the art of manufacture or powder paints.

EXAMPLE

By way of illustration, results of comparative tests were made on the process of this invention for cooling and sheeting a high-temperature extruded molded resin by using the continuous cooling and sheeting machine according to this invention (as shown in FIG. 4) and on the conventional cooling and sheeting method using cold air or cooling rolls. The comparison was conducted on the scale of the apparatus, the output, the resin quality and the efficiency of the cooling effect. In these tests, the air pressure at each air blasting nozzle was maintained at 2 to 3 Kg/cm$^2$.

The thermosetting resinous composition used had the following formula:

| | |
|---|---|
| Epoxy resin (Epikote #1004; trademark for a product manufactured by Shell International Chemicals) | 100 parts by weight |
| Dicyandiamide | 5 parts by weight |
| Titanium dioxide | 25 parts by weight |
| Flowability-adjusting agent (Modaflow; trademark for a product manufactured by | 0.2 part by weight |

-continued

Monsanto Chemicals)

The composition was melt-kneaded at 120 to 140° C in an extruder, and then, it was cooled and formed into a sheet under the conditions shown in Tables 1, 2 and 3.

Samples Nos. 1 to 7 shown in Table 1 are sheets formed by the roll assembly according to this invention.

Samples Nos. 8 to 14 shown in Table 2 are sheets formed according to conventional methods in which the extrusion rate was low and the extrudate was cooled by air cooling, water sprinkling or being immersed in water.

Samples Nos. 15 to 18 shown in Table 3 are sheets formed according to the same conventional methods while adopting a higher extrusion rate.

with the surfaces of cooling rolls, and the contact area was enlarged and the contact time was prolonged, the cooling efficiency could be highly improved.

Further, as is seen from the results shown in Table 3, if the extrusion rate was increased to 300 to 500 Kg/hour in the conventional method, in order to obtain a cooling efficiency obtainable at a low extrusion rate, the length of the conveyor had to be prolonged 3 times or more, and even when the temperature of cooling air was reduced to 5° C or lower and a circulation system was adopted so that the sheet was passed through a tunnel of cooling air, it was impossible to reduce the temperature of sheet at the terminal end of the conveyor below 60° C. Further, if such arrangement was made, the equipment space had to be increased drastically.

Also from the results shown in Table 3, it will readily

Table 1

| | Cooling and Sheeting According to Process of This Invention | | | | | |
|---|---|---|---|---|---|---|
| Sample No. | Extrusion Rate (Kg/hour) of Extruder | Temperature of Composition (° C) at Extruder Outlet | Size of Expanded Sheet | Temperature (° C) of Water Passing through Cooling Roll | Roll Rotation Speed (m/min) (total roll assembly length=2.5m) | Temperature of Sheet (° C) at Terminal End of Roll Assembly |
| 1 | 150 | 120 | 1.5mm × 250mm | 30 | 4.8 | 40 |
| 2 | 150 | 120 | 2.5mm × 250mm | 30 | 2.9 | 49 |
| 3 | 300 | 110 | 1.5mm × 250mm | 30 | 9.5 | 38 |
| 4 | 300 | 110 | 2.5mm × 250 mm | 20 | 5.7 | 47 |
| 5 | 300 | 110 | 2 mm × 300mm | 30 | 6.0 | 41 |
| 6* | 500 | 110 | 1.5mm × 250mm | 20 | 10.9 | 47 |
| 7 | 500 | 110 | 2 mm × 300mm | 20 | 9.9 | 46 |

*The contact angle for the sheet was made larger than in other samples by adjusting the second and third casting rolls (namely, the time for contact between the sheet and the rolls was made longer than in other samples).

Table 2

| | Conventional Sheeting and Cooling Methods by Air Cooling or Water Sprinkling (extrusion rate = 150 Kg/hour) | | | | | | | |
|---|---|---|---|---|---|---|---|---|
| Sample No. | Extrustion Rate (Kg/hour) of Extruder | Temperature of Composition (° C) at Extruder Outlet | Size of Expanded Sheet | Water Sprinkling | Temperature (° C) of Cooling Air | Speed (m/min) of Conveyer | Length (m) of Conveyer | Temperature of Sheet (° C) at Terminal End of Conveyer |
| 8 | 150 | 120 | 1.5mm × 250mm | not effected | 20 | 4.8 | 5 | 68 |
| 9 | 150 | 120 | 1.5mm × 250mm | not effected | 30 | 4.8 | 5 | 75 |
| 10 | 150 | 120 | 2.5mm × 250mm | not effected | 20 | 2.9 | 5 | 80 |
| 11 | 150 | 120 | 2.5mm × 250mm | not effected | 30 | 2.9 | 5 | 90 |
| 12 | 150 | 120 | 2.5mm × 250mm | effected | 20 | 2.9 | 5 | 70 |
| 13 | 150 | 120 | 2.5mm × 250mm | not effected | 5 | 2.9 | 5 | 90 |
| 14 | 150 | 120 | 2.5mm × 250mm | in water | — | 2.9 | 5 | 30 |

Table 3

| | Conventional Sheeting and Cooling Methods by Air Cooling or Water Sprinkling (extrusion rate = 300 to 500 Kg/hour) | | | | | | | |
|---|---|---|---|---|---|---|---|---|
| Sample No. | Extrusion Rate (Kg/hour) of Extruder | Temperature of Composition (° C) at Extruder Outlet | Size of Expanded Sheet | Water Sprinkling | Temperature (° C) of Cooling Air | Speed (m/min) of Conveyer | Length (m) of Conveyer | Temperature of Sheet (° C) at Terminal End of Coneyer |
| 15 | 300 | 140 | 2mm × 300mm | not effected | 5 (circulated) | 6 | 10 | 60 |
| 16 | 500 | 140 | 2mm × 300mm | not effected | 5 (circulated) | 9.9 | 10 | 85 |
| 17 | 300 | 140 | 2mm × 300mm | not effected | 5 (circulated) | 6.0 | 6 | 95 |
| 18 | 500 | 140 | 2mm × 300mm | not effected | 5 (circulated) | 9.9 | 5 | 115 |

As is seen from the results shown in Tables 1 and 2, when the extruded resin was cooled and formed into a sheet according to the conventional air-cooling method, even if air cooled to 5° C or lower was fed, good cooling efficiency could not be obtained, whereas if according to this invention, the entire sheet was contacted be understood that in the conventional method, the temperature of sheet at the terminal end of the conveyor was drastically high when the extrusion rate of the extruder was increased.

Each of the above sample sheets prepared according to the process of this invention and to the above-mentioned conventional methods were ground by means of a granulator (such as a roll crusher) and comminuted by an air stream pulverizer to form a powder paint having an average particle size of 40 to 60μ. Then, the powder paint was electrostatically applied to a steel plate so that a film having a thickness of 80 to 100μ would be formed. Then, the applied paint was heated at 200° C for 30 minutes. The so obtained coating films were subjected to tests shown in Table 4 to compare the properties of these coating films. The results obtained are shown in Table 4.

Table 4

Results of Comparative Tests on Properties of Coatings

| Example No. | Extrusion Rate (Kg/hour) | Condition of Coated Surface | Luster | Erichsen Test (mm) | Du Pont Type Impact Test (cm), ½ inch, 500 g |
|---|---|---|---|---|---|
| Process of This Invention | | | | | |
| 1 | 150 | good | 94 | above 8 | 50 |
| 2 | 150 | good | 94 | above 8 | 50 |
| 3 | 300 | good | 92 | above 8 | 50 |
| 4 | 300 | good | 91 | above 8 | 50 |
| 5 | 300 | good | 93 | above 8 | 50 |
| 6 | 500 | good | 91 | above 8 | 50 |
| 7 | 500 | good | 92 | above 8 | 50 |
| Conventional Methods | | | | | |
| 8 | 150 | good | 92 | above 8 | 50 |
| 9 | 150 | good | 93 | above 8 | 50 |
| 10 | 150 | good | 89 | above 8 | 50 |
| 11 | 150 | good | 90 | above 8 | 50 |
| 12 | 150 | fine convexities and concavities, delustering | 88 | 7.1 | 40 |
| 13 | 150 | slight bittiness | 87 | 7.7 | 50 |
| 14* | 150 | Bittiness, fine convexities and concavities | 85 | 7.0 | 30 |
| 15 | 300 | good | 89 | above 8 | 50 |
| 16 | 500 | good | 88 | above 8 | 50 |
| 17 | 300 | sight bittiness | 84 | 7.2 | 40 |
| 18 | 500 | bittiness, orange peel | 82 | 6.0 | 30 |

*Water was sprinkled on the sheet at the outlet of the conveyer.

As is apparent from the results shown in Table 4, when the conventional methods were worked at high extrusion rates, there were brought about such defects as decomposition of curing agents caused by sprinkling of water and deviation of the temperature at the terminal end of the conveyor, and the surface conditions and physical properties, such as luster and impact resistance, of the resulting coatings were substantially inferior to those of the coatings obtained to the process of this invention.

Effects and advantages of the process of this invention over the conventional methods are as follows;

1. Even at such a high resin extrusion rate as 300 to 500 Kg/hour the temperature of sheet at the terminal end of the roll assembly can be maintained at a level suitable for granulation, namely below 50° C.

2. The dimensions of the equipment can be reduced.

3. Degradation of the quality such as caused by sprinkling of water can be completely prevented, and powder paints of high quality can be manufactured in large quantities at high manufacturing rates.

4. Coatings prepared from powder paints according to this invention are excellent in surface condition, luster, Erichsen value and impact resistance.

What is claimed is:

1. A process for the production of thermosetting resin powder paints which consists of the steps (1) melting and kneading a thermosetting resinous composition which contains curing agents at a temperature higher than the softening point but lower than the curing point of the resinous composition, extruding said thermosetting resinous composition for a powder paint in the molten state from an extruder die, at temperature between 90° C and 140° C, at a rate between 100 and 600 kg/hr. (2) continuously cooling the extruded composition and forming it into a sheet under conditions to avoid curing of the resin by means of a plurality of rolls including press rolls for rolling the composition into a sheet, cooling feed rolls and withdrawal take-up rolls disposed in this order, applying air from air blasting nozzles, which nozzles are opened to face the entire surfaces of the cooling feed rolls, at a distance from the cooling feed rolls of between 20 and 150mm, at an air rate of at least 30m/sec, at a pressure of between 1.5 and 4kg/cm² while controlling the sheet temperature at the terminal portion of the withdrawal take-up rolls between room temperature and 50° C, and (3) pulverizing the so formed sheet.

2. A process according to claim 1 wherein the transportation rate of the sheet is controlled at a rate of 5 to 10 m/min. at the withdrawal take-up rolls.

3. A process according to claim 1 wherein the cooling temperature of the cooling rolls is between 15° C and 30° C.

4. The process according to claim 1 wherein the entire sheet is contacted with the surface of the cooling feed rolls.

* * * * *